United States Patent [19]

Falk

[11] 4,252,704

[45] Feb. 24, 1981

[54] GRAFT POLYMERS WITH CROSS-LINKED POLYESTER ELASTOMERS

[75] Inventor: John C. Falk, Chicago, Ill.

[73] Assignee: Borg-Warner Corporation, Chicago, Ill.

[21] Appl. No.: 45,569

[22] Filed: Jun. 4, 1979

[51] Int. Cl.³ ............................................. C03L 67/00
[52] U.S. Cl. ................................ 260/29.2 E; 525/23; 525/27; 525/41; 525/43
[58] Field of Search .................. 525/445, 447, 23, 27, 525/41, 43; 260/29.2 E

[56] References Cited

U.S. PATENT DOCUMENTS

| | | | |
|---|---|---|---|
| 3,044,978 | 7/1962 | Hägele et al. | 525/445 |
| 3,565,780 | 2/1971 | Zimmerman | 525/445 |

*Primary Examiner*—J. Ziegler
*Attorney, Agent, or Firm*—Richard J. Schlott

[57] ABSTRACT

Graft polymers comprising at least one monomer selected from vinyl aromatic monomers and acrylic monomers polymerized in the presence of a cross-linked, aliphatic polyester elastomer.

5 Claims, No Drawings

GRAFT POLYMERS WITH CROSS-LINKED POLYESTER ELASTOMERS

BACKGROUND OF THE INVENTION

This invention relates to novel graft copolymers and to a method for their preparation. More particularly, this invention relates to graft copolymers of vinyl monomers on cross-linked, aliphatic polyester elastomers. Still more particularly, this invention relates to graft polymer compositions prepared by graft polymerizing a monomer mixture comprising styrene and acrylonitrile in the presence of a cross-linked, aliphatic polyester elastomer substrate.

Linear, aliphatic polyesters have been employed in the prior art as grafting substrates for a variety of vinyl monomers including styrene, acrylonitrile and the like, to prepare thermoplastic molding compositions as is disclosed, for example, in U.S. Pat. No. 3,577,478. Linear, aliphatic polyesters are also known in the art as useful plasticizers for a variety of vinyl resins such as polyvinyl chloride and polystyrene, and have been included in the preparation of an ABS resin by bulksuspension polymerization processes to impart improved processability and plasticization to the resulting ABS graft polymers, as is disclosed in U.S. Pat. No. 3,935,153. The use of linear polyesters in these prior art compositions does not appear to impart high impact characteristics without the further including of conventional diene rubber substrate and impact modifiers.

SUMMARY OF THE INVENTION

Graft polymers prepared by graft polymerizing one or more vinyl monomers in the presence of a suitably cross-linked, aliphatic polyester elastomer are high impact thermoplastic resins possessing a useful balance of physical properties.

DETAILED DESCRIPTION OF THE INVENTION

The graft polymers of this invention are prepared by polymerizing at least one copolymerizable vinyl monomer in the presence of a suitably cross-linked, aliphatic polyester elastomer.

The vinyl monomers suitable for the purposes of preparing graft polymers according to the practice of this invention include vinyl aromatic monomers and acrylic monomers. More particularly, vinyl aromatic monomers including styrene, vinyl toluene, alpha methylstyrene, halostyrene and the like, and acrylic monomers including acrylonitrile, methacrylonitrile, the lower alkyl esters of acrylic acid such as methyl acrylate, ethyl acrylate and the like, and the lower alkyl esters of methacrylic acid such as methyl methacrylate, ethyl methacrylate and the like, as well as mixtures thereof are suitable for the preparation of the graft polymers of this invention.

The cross-linked polyester elastomers suitable for the purposes of this invention are linear, high molecular weight, aliphatic, polyester rubbers which have been converted to a latex, then cross-linked. The latex may be employed in blending directly, or coagulated to form free-flowing rubber particles.

The polyesters are more particularly the linear, aliphatic polyesters described and set forth in U.S. Pat. No. 2,448,585. In general, the elastomeric polyesters may be described as copolymers of aliphatic dicarboxylic acids and glycols wherein from about 0 to about 20% of the glycol and/or the dicarboxylic acid is ethylenically unsaturated. More particularly, the polyesters will be polymers of $C_2$ to $C_{10}$ alkylene glycols and $C_4$ to $C_{10}$ alkylene dicarboxylic acids wherein from 0 to about 20% of the glycol monomer component and/or the dicarboxylic acid monomer component is, respectively, a $C_4$ to $C_{10}$ dihydroxy alkene or a $C_4$ to $C_{10}$ alkenyl dicarboxylic acid. Examples of suitable alkylene glycols include ethylene glycol, propylene glycol, tetramethylene glycol, pentamethylene glycol, hexamethylene glycol, decamethylene glycol, the position isomers thereof such as isopropylene glycol, neopentyl glycol, dimethyl tetramethylene glycol and the like, as well as mixtures thereof. Suitable dihydroxyalkenes include, for example, dihydroxybutene, dihydroxyhexene and the like. The alkylene dicarboxylic acids include, for example, succinic acid, adipic acid, sebacic acid and the like, as well as mixtures thereof. The alkenyl dicarboxylic acids which may be employed for the preparation of unsaturated polyesters include maleic acid, fumeric acid, itaconic acid, citraconic acid and the like. The polyesters may be readily produced by the processes set forth in the cited prior art, and the particular method of their preparation does not form a part of the instant invention.

In preparing the cross-linked polyester latex useful in the practice of this invention, the polyester is first dissolved in a suitable organic solvent. The organic solvent must be immiscible with water, and be sufficiently volatile to be readily stripped from an aqueous emulsion. Examples of suitable solvents include chloroform, methylene chloride, benzene, toluene and the like.

The solution will contain from about 5 to about 20 wt%, preferably from about 7.5 to about 12.5%, of the polyester. Concentrated solutions of polyesters are generally extremely viscous masses which flow and are dispersed only with great difficulty. The particular concentration to be employed will be chosen to provide a moderately viscous, readily pumpable liquid. Low concentrations, and in particular concentrations below about 5 wt%, are to be avoided in part to reduce the amount of solvent to be stripped from the emulsion in a subsequent step. In practice it has been found that for most combinations of solvents and polyesters a concentration in the preferred range of 7.5 to 12.5 wt% provides a readily dispersable, easily handled liquid.

An emulsion of the polyester is then prepared by mixing the solution of polyester with approximately an equal volume of water containing a surfactant. Any of the variety of commercially available surfactants such as the sodium alkyl aryl sulfonates may be employed to stabilize the emulsion. An amount of from about 0.5 to about 10 wt% based on the weight of polyester to be emulsified is generally sufficient to provide a stable latex. The mixing is carried out under high shear conditions, preferably by passing the mixture through a homogenizer to completely disperse the organic phase and form an essentially uniform, oil-in-water emulsion.

The solvent will then be stripped from the emulsion by heating the mixture and distilling the solvent. The distillation may be accomplished under vacuum, if desired, to hasten solvent removal, and steam-stripping or sparging may also be used if preferred. The resulting solvent-free latex comprises finely dispersed, uncross-linked polyester in aqueous emulsion.

Cross-linking of the polyester in latex form is accomplished by adding a suitable peroxide catalyst such as benzoyl peroxide, lauryl peroxide or the like, and heating the mixture to effect decomposition of the peroxide and cross-linking of the polyester. The amount of peroxide will be from about 0.5 to about 5 wt%, based upon the weight of polyester. Although the peroxide may be dispersed into emulsion prior to stripping or into the solvent-free, uncross-linked latex, it is generally more practical to add the peroxide to the solution of the polyester prior to forming the initial emulsion. The solvent-stripping and cross-linking can then be accomplished by heating the emulsion to effect solvent removal, then continuing the heating of the solvent-free latex to complete the cross-linking reaction.

The graft polymer is prepared by polymerizing the vinyl monomer in the presence of the cross-linked, polyester elastomer substrate. The polymerization may be accomplished by a variety of conventional graft polymerization techniques including latex and suspension processes. For example, the vinyl monomers together with a polymerization catalyst may be added directly to the latex of the cross-linked, polyester elastomer. The mixture is heated and stored to initiate the reaction and complete the graft polymerization of the vinyl monomers. Alternatively, the latex of the cross-linked, polyester elastomer may be coagulated to form a finely divided particulate solid, which then is dispersed in he monomers. The monomer/polyester mixture, together with a free radical catalyst, is then dispersed in water containing a suspending aid, and suspension polymerization is carried out to provide a suspension of the graft polymer resin. These and other graft polymerization processes are widely employed in the preparation of a variety of conventional graft polymers including ABS resins and will be readily adapted by those knowledgable in the art of polymerization processes to the preparation of the graft polymers of the instant invention. The process features of the graft polymerization reaction employed in preparing the compositions of the instant invention are thus conventional and do not form a part of the invention disclosed herein.

The graft polymer compositions of this invention will comprise from 90 to 30 wt% of the superstrate vinyl monomer component polymerized in the presence of from 10 to 70 wt% of the substrate cross-linked, polyester elastomer. At levels below about 50 wt% of the polyester elastomer, the graft polymers are tough thermoplastics having good impact properties, while at levels at and above about 50 wt% of the polyester the graft polymers are soft, rubbery compositions useful as modifiers in forming blends with other thermoplastic resins. The essential feature of the instant invention is the use of a finely divided and cross-linked, polyester elastomer as the substrate for the preparation of graft polymers.

In prior art preparations, uncross-linked polyesters were employed, either dispersed or dissolved in the monomers. The polyester, being neither cross-linked nor finely divided and particulate in form, provided little or no impact reinforcement to these prior art resins and acted only as a plasticizer.

The preparation of the graft polymer compositions of the instant invention will be better understood by consideration of the following examples, which are provided by way of illustration and not limitation.

Preparation of Cross-linked Polyester Elastomer Substrates

EXAMPLE 1

Preparation of the Polyester

A resin flask was charged with 70.1 g (0.48m) of adipic acid, 4.8 g (0.078m) of ethylene glycol, 29.5 g (0.39m) of propylene glycol, 6.4 g (0.072m) of 1,4 dihydroxybutene-2, and 0.24 g of zinc acetate catalyst. The mixture was heated at 140°–150° C. under nitrogen for approximately five hours. The temperature was then raised to 200°–220° C. over a two hour period, and held at that temperature under a vacuum of 0.5 mm for an additional two hours. The mixture was then cooled to room temperature. The reaction mass was a crummy solid having a nsp/c of 0.61 (25°) and a number average molecular weight of 18,5000.

EXAMPLE 2

Preparation of a Polyester Latex

A solution of 20 g of the polyester of Example 1 in 200 ml of methylene chloride was prepared and added to 200 ml of water containing 0.2 g of an alkyl aryl sulfonate surfactant. The mixture was passed twice through a Manton Gaulin homogenizer to produce a stable emulsion. The emulsion was heated with stirring to 90° C. to distill out the methylene chloride, resulting in a stable latex of uncross-linked polyester elastomer.

The latex was coagulated with isopropanol, collected by filtration and dried to give a tacky solid gum. The gum was completely soluble in toluene, indicating that no gel formation had occurred.

EXAMPLE 3

Preparation of a Cross-linked Polyester Latex

A solution of 20 g of the polyester of Example 1 and 0.4 g of benzoyl peroxide in 200 ml of methylene chloride was prepared and emulsified with 200 ml of water containing 0.2 g of an alkyl aryl sulfonate surfactant as in Example 2. The emulsified mixture was heated with stirring to 90° C. to distill out the methylene chloride, then held at 90° C. for about 17 hours to effect cross-linking of the polyester. The product was a stable latex of cross-linked polyester.

The latex was coagulated with isopropanol, collected by filtration and dried to give a free-flowing powder. The powdered cross-linked elastomer had a gel content of 91% as determined by toluene extraction.

EXAMPLE 4

Preparation of a Cross-linked Saturated Polyester Latex

A saturated polyester was prepared from 0.48 m (97 g) of sebacic acid and 0.44 m (33.4 g) of propylene glycol, using 0.24 g of zinc acetate catalyst and employing the process of Example 1. A solution of 20 g of the polyester and 1.0 g of benzoyl peroxide in 200 ml of methylene chloride was emulsified, solvent stripped and cross-linked by heating at 90° C. for 16 hours, by following the methods of Example 3. The product was a stable latex of cross-linked, saturated polyester.

The cross-linked, saturated polyester was coagulated with isopropanol, collected by filtration and dried to give a free-flowing powder. The powdered cross-linked elastomer had a gel content of 71%, as determined by toluene extraction.

EXAMPLE 5

Preparation of a Cross-Linked Unsaturated Copolyester Latex

A polyester was prepared from 0.475 m of sebacic acid, 0.025 m of maleic acid, 0.50 m of neopentyl glycol and 0.125 m of ethylene glycol, using 0.25 g of zinc acetate catalyst and employing the process of Example 1. The product was polyester had an nsp/c of 0.67 (25° C.). A solution of 20 g of the polyester and 0.4 g of benzoyl peroxide in 250 ml of benzene was emulsified, solvent stripped and cross-linked by heating at 90° C. for 16 hours, following the methods of Example 3. The product was a stable latex of cross-linked, polyester elastomer having a gel content of 83%, determined by toluene extraction.

As is apparent from the Examples, stable cross-linked saturated (Examples 3 and 5) and unsaturated (Example 4) polyester laticies are readily produced by the process of this invention. The coagulation of the cross-linked laticies result in free-flowing powdered elastomers, completely different in physical characteristics from the tacky gum elastomers (Example 1). That the powdery nature of the products is not the result of precipitation from a latex is demonstrated by Example 2, in which an uncross-linked latex produces a gummy solid upon coagulation.

Preparation of the Graft Polymers

The following examples illustrate the preparation of graft polymers typical of this invention.

EXAMPLE 6

SAN Graft Polymer from a Cross-Linked Polyester Latex

A resin flask was charged with 140 ml of the latex of Example 3, containing 14 g of cross-linked polyester elastomer. A mixture of 36 g of styrene, 20 g of acrylonitrile and 1.4 g of benzoyl peroxide were then added to the latex with constant stirring. The mixture was maintained under an inert gas (nitrogen) atmosphere with stirring and heated at 72° C. for 16 hours to complete the polymerization of the vinyl monomers. The mixture, a thick latex, was cooled, coagulated with isopropanol, and the solid resin was collected by filtration and dried in a vacuum oven at 80° C. overnight. The product resin, a finely divided particulate solid, amounted to (66.5 g, 95% of theory.

EXAMPLE 7

SAN Graft Polymer from a Solid Cross-Linked Polyester Elastomer

To a solution of 36 g of styrene, 20 g of acrylonitrile and 0.7 g of benzoyl peroxide were added 14 g of the dried, powdery cross-linked polyester elastomer prepared as in Example 3. The mixture was suspended in 160 g of water containing 0.03 g of polyvinyl pyrolidone suspending aid. The stirred suspension was heated under an inert gas (nitrogen) atmosphere at 72° C. for 20 hours to complete polymerization of the vinyl monomers. The mixture was cooled, and the particulate graft polymer was collected by filtration, washed with methanol and dried overnight at 50° C. in a vacuum oven. The powdery solid graft polymer amounted to 64 g, 91% of theory.

EXAMPLES 7-17

In the following Examples, Table 1, graft polymers were prepared from polyesters having the indicated compositions by the procedure of Example 6. Test specimens were prepared from the dried resins by milling the resins with 0.25 wt% Irganox stabilizer and 0.25 wt% magnesium stearate lubricant on a two-roll mill at 350° F. for 4 to 10 minutes, then compression molding at 400° F. for 3-4 minutes.

TABLE I

SAN Grafts on Polyester Elastomers[1]

| | Polyester Composition[2] | | | | | Graft Polymer Properties | | | | | |
|---|---|---|---|---|---|---|---|---|---|---|---|
| Ex No. | Acid | m % | Glycol | m % | Cross-Linked | Gel % | Izod Impact | Tensile Str, psi | E % | Flexural Mod, Kpsi | Flexural Str, Kpsi | HDT °C. |
| 7 | Adipic | 50 | Propylene | 50 | No | 0 | 0.2 | 6300 | 5 | 456 | 11.8 | 54 |
| 8 | Adipic | 50 | Propylene | 50 | Yes | 77 | 0.8 | 6600 | 10 | 446 | 14.1 | 70 |
| 9 | Adipic | 50 | Propylene Butene | 35 15 | No | 0 | 0.5 | 6250 | 5 | 400 | 11.1 | 72 |
| 10 | Adipic | 50 | Propylene Butene | 35 15 | Yes | 91 | 1.7 | 7200 | 8 | 415 | 13.8 | 81 |
| 11 | Adipic | 50 | Propylene Ethylene Butene | 19 16 15 | Yes | 87 | 0.8 | — | — | — | — | — |
| 12 | Adipic | 50 | Propylene Ethylene Butene | 10 25 15 | Yes | 66 | 1.7 | — | — | — | — | — |
| 13 | Sebacic | 50 | Propylene | 50 | No | 0 | 0.2 | 5700 | 5 | 386 | 10.1 | 72 |
| 14 | Sebacic | 50 | Propylene | 50 | Yes | 55 | 1.1 | 5800 | 9 | 400 | 12.4 | 90 |
| 15 | Sebacic | 50 | Propylene Butene | 35 15 | No | 0 | 0.4 | 6400 | 5 | 466 | 13.9 | 78 |
| 16 | Sebacic | 50 | Propylene Butene | 35 15 | Yes | 92 | 1.0 | 5500 | 20 | 407 | 12.1 | 88 |
| 17 | Sebacic Maleic | 47.5 2.5 | Neopentyl Ethylene | 50 12.5 | Yes | — | 1.6 | 4900 | 12 | 286 | — | 78 |

Notes:
[1] Graft polymers contain 20 wt % cross-linked polyester, 80% styrene-acrylonitrile. S/AN ratio is 1.8/1. Preparations by the process of Example 6.
[2] Polyesters have the indicated compositions, prepared by the process of Example 1 converted to a latex by the process of Example 2 (not cross-linked) or Examples 3-5 (cross-linked).

It will be apparent from the physical property data summarized in Table 1 that the graft polymers of this invention have useful physical properties. By comparing Examples 7 with 8, 9 with 10, 13 with 14 and 15 and 16, it will be seen that substantial impact improvement results from cross-linking the polyester in latex form before carrying out the graft polymerization reaction. Graft polymers prepared from uncross-linked polyester elastomers are substantially lower in impact properties even though present in a finely divided latex form at the outset of the graft polymerization.

EXAMPLE 18

The cross-linked polyester latex prepared in Example 5 was grafted with an equal weight of styrene and acrylonitrile (S/AN=2/1) substantially by the procedures of Example 6, to provide a graft polymer having a composition comprising 50 wt% polyester elastomer substrate and 50 wt% superstrate styreneacrylonitrile polymer. The product, on compression molding, gave a somewhat rubbery test specimen. This graft copolymer readily formed blends with SAN copolymer and with PVC by milling on a two-roll mill at 400°–450° C. for 3–7 minutes. Compression molded specimens of blends containing 20 wt% of the graft polymer were strong, rigid thermoplastics.

The instant invention will thus be seen to be a graft polymer of one or more vinyl monomers on a cross-linked, aliphatic polyester substrate. The vinyl monomer superstrate components, which will be selected from the group consisting of vinyl aromatic monomers and acrylic monomers, comprise from 80 to 30 wt% of the final composition, and the cross-linked polyester elastomer substrate will comprise correspondingly from 20 to 70 wt% of the final composition. The graft polymers are useful as thermoplastics, and may be employed as modifiers to form blends with a variety of conventional thermosplastics such as PVC and SAN. It will be apparent to those skilled in the art that the resins of this invention may be further compounded with various stabilizers, fillers, pigments, lubricants and processing aids, and that further modifications may be made without departing from the spirit and scope of the teachings of this invention which is defined solely by the following claims.

I claim:

1. In a polymeric composition comprising from 80 to 30 wt% of at least one vinyl monomer graft polymerized in the presence of from 20 to 70 wt% of a polyester, the improvement wherein said polyester is a cross-linked, aliphatic polyester elastomer prepared by the steps of
   A. Providing a solution comprising from 95 to 80 parts by weight of a water-immiscible organic solvent, from 5 to 20 parts by weight of an aliphatic, polyester elastomer and from 0.5 to 5 wt%, based on polyester, of an organic peroxide;
   B. Mixing said solution with an equal volume of water containing from 1 to 10 wt%, based on polyester, of a surfactant;
   C. Passing said mixture through a homogenizer to form an emulsion;
   D. Heating said emulsion to remove said solvent; and
   E. Further heating said emulsion to cross-link said polyester and form a stable latex.

2. The composition of claim 1 wherein said vinyl monomer is selected from the group consisting of vinyl aromatic monomers, acrylic monomers and mixtures thereof.

3. The composition of claim 2 wherein the vinyl aromatic monomer is styrene and the acrylic monomer is acrylonitrile.

4. The composition of claim 1 including the further step of coagulating said stable latex.

5. The composition of claim 1 including the further steps of coagulating said stable latex and drying to form a powdered, cross-linked, aliphatic polyester elastomer.

* * * * *